United States Patent [19]

Huang

[11] Patent Number: 5,803,691

[45] Date of Patent: Sep. 8, 1998

[54] STRIP FOR SUPPORTING NAILS

[76] Inventor: Shih Chang Huang, No. 134, Yiau San Street, San Min Chu, Kaoshiung, Taiwan

[21] Appl. No.: 871,422

[22] Filed: Jun. 9, 1997

[51] Int. Cl.[6] ............................. F16B 15/08; B65D 85/24
[52] U.S. Cl. ............................ 411/442; 411/441; 206/347
[58] Field of Search ................................. 411/442, 443, 411/444, 441; 206/345, 347

[56] References Cited

U.S. PATENT DOCUMENTS 3,955,674  5/1976  Maier ...................................... 206/347
5,522,687  6/1996  Chen ....................................... 411/444
5,544,746  8/1996  Dohi ....................................... 206/347

*Primary Examiner*—Flemming Saether

[57] ABSTRACT

A strip includes a number of holes and three or more bars extended downward from the peripheral portion of each of the holes for resiliently engaging with the fastener and for decreasing the contact area between the strip and the fastener. A cylindrical member is secured to the bottom portion of the bars and includes one or more slits for forming one or more coupling portions and for allowing the coupling portions to be easily broken when the fasteners are punched against the cylindrical member and punched away from the strip.

3 Claims, 2 Drawing Sheets

STRIP FOR SUPPORTING NAILS

This application is related to application Ser. No. 08/843,687 filed Apr. 10, 1997.

BACKGROUND OF THE INVENTION

1. Field of the Invention

The present invention relates to a strip, and more particularly to a strip for supporting nails.

2. Description of the Prior Art

A typical strip for supporting nails is disclosed in U.S. Pat. No. 5,522,687 to Chen and comprise a strip body having a number of holes for engaging with nails. The strips are engaged in a nailing or stapling mechanism for supplying the nails into the nailing mechanism and for allowing the nails to be driven out of the strips. However, the peripheral wall for defining the holes include solid structure such that the strip will be broken when the nails are punched out of the strip.

The present invention has arisen to mitigate and/or obviate the afore-described disadvantages of the conventional strips.

SUMMARY OF THE INVENTION

The primary objective of the present invention is to provide a strip for allowing the nails to be easily driven out of the strip body without breaking the strip body.

In accordance with one aspect of the invention, there is provided a strip comprising a strip body including a plurality of holes each having a peripheral portion for engaging with fasteners, the strip body including at least three bars extended downward from the peripheral portion of each of the holes for decreasing a contact area between the strip body and the fasteners, the bars including a bottom portion, and the strip body including a cylindrical member secured to the bottom portion of the bars of each of the holes, the cylindrical member including at least one slit for forming at least one coupling portion and for allowing the coupling portion to be easily broken when the fasteners are punched against the cylindrical member and punched away from the strip body.

The bars are inclined and each includes a bottom portion having a reinforcing rib for reinforcing purposes.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
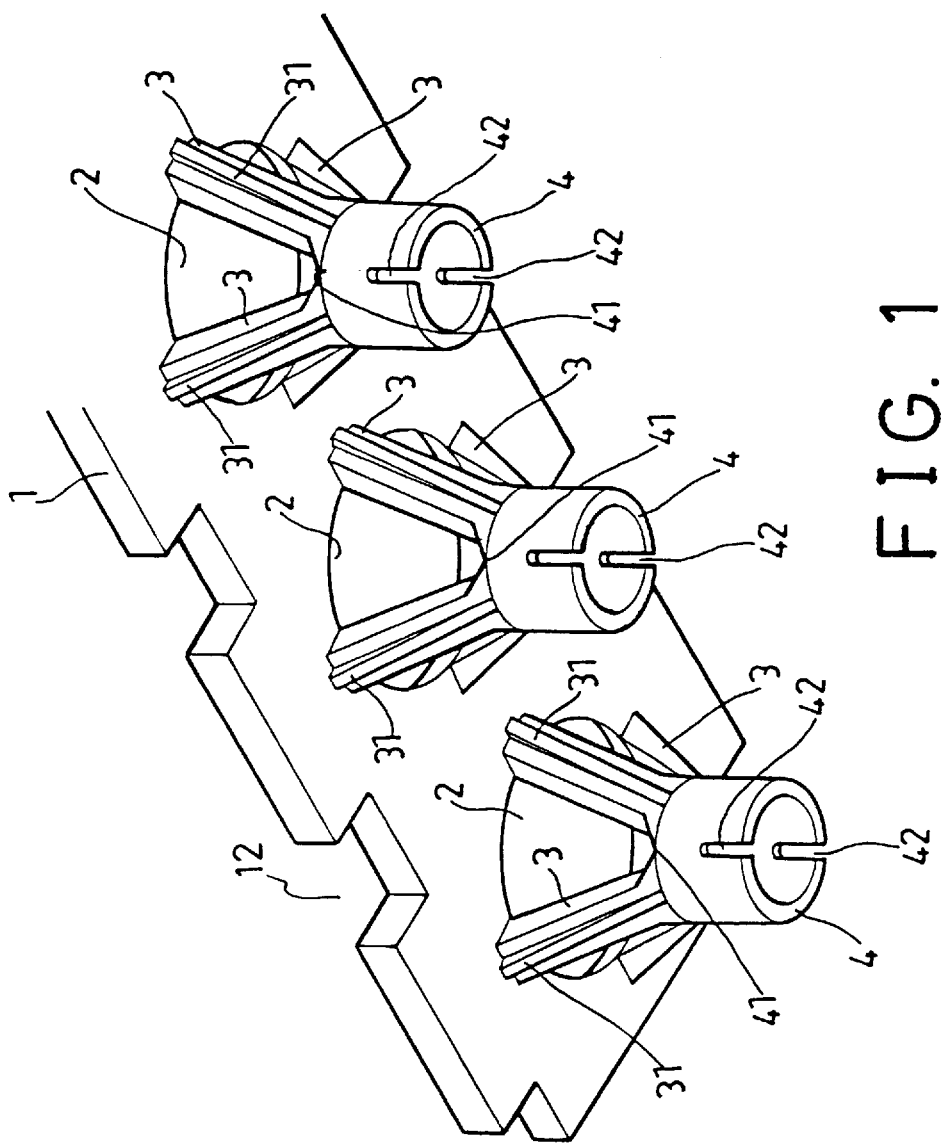
FIG. 1 is a partial perspective view of a strip in accordance with the present invention.
Figure 2:
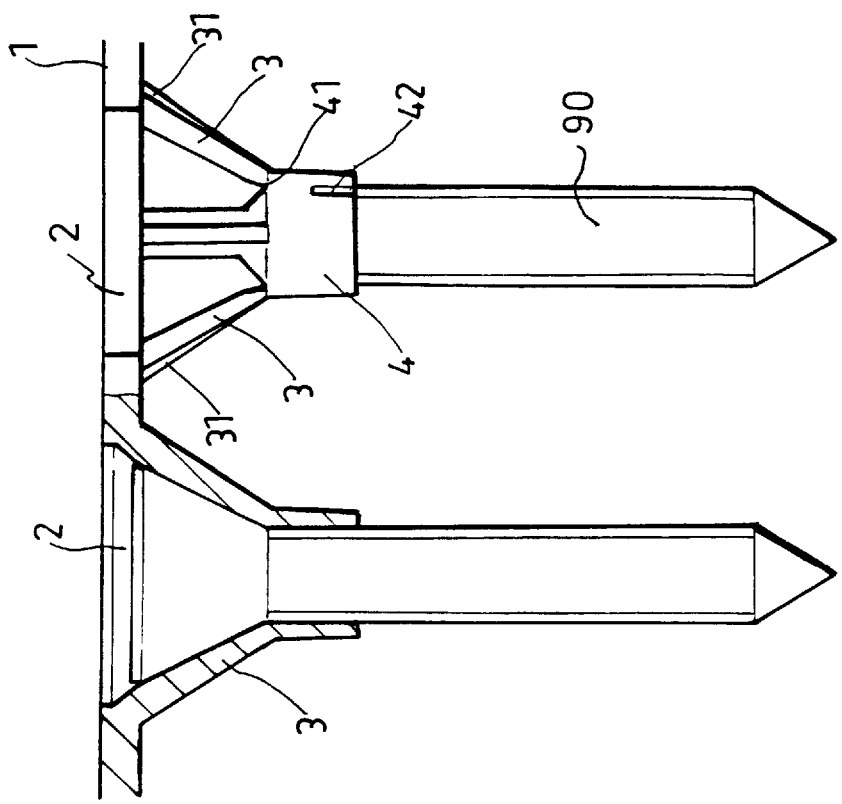
FIG. 2 is a partial cross sectional view of the strip, illustrating the application of the strip.

Referring to the drawings, a strip in accordance with the present invention comprises a strip body 1 including two side edges each having a number of notches 12 for engaging with a nailing mechanism and for allowing the strip body 1 to be driven by the nailing mechanism. The strip body 1 includes a number of holes 2 and includes at least three bars 3 extended downward from the peripheral portion of each of the holes 2, for engaging with fasteners, such as bolts or nails or screws 90, and for decreasing the contact area between the strip body 1 and the fastener 90. The bars 3 are preferably tapered or inclined and each includes a reinforcing rib 31 provided on the bottom portion for reinforcing purposes. A cylindrical member 4 is secured to the bottom of the bars 3 and has a reduced diameter as compared with that of the holes 2. The cylindrical member 4 includes one or more slits 42 for forming one or more coupling portions 41.

It is to be noted that the bars 3 and the cylindrical members 4 are retained in shape and retained in the position by the coupling portions 41 only. The coupling portions 41 may be easily broken by the fasteners 90 when the fasteners 90 are punched downward against the cylindrical members 4. The bars 3 greatly reduce the contact area between the fastener and the strip body 1 for allowing the strip to resiliently supporting the fasteners and for further facilitating the disengaging operation of the fasteners 90 from the strip body 1.

Accordingly, the strip in accordance with the present invention may resiliently support the fasteners for allowing the fasteners to be easily disengaged from the strip.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A strip for supporting fasteners and for supplying the fasteners into a stapling mechanism and for allowing the fasteners to be punched by the stapling mechanism, said strip comprising:

a strip body including a plurality of holes each having a peripheral portion for engaging with the fasteners, said strip body including at least three bars extended downward from said peripheral portion of each of said holes for decreasing a contact area between said strip body and the fasteners, said at least three bars including a bottom portion, and said strip body including a cylindrical member secured to said bottom portion of said bars, said cylindrical member including at least one slit formed therein and opposite to said bars and forming at least one coupling portion and for allowing said at least one coupling portion to be easily broken when the fasteners are punched against said cylindrical member and punched away from said strip body.

2. A strip according to claim 1, wherein said bars are inclined.

3. A strip according to claim 2, wherein said bars each includes a tapered bottom surface having a reinforcing rib for reinforcing purposes.

* * * * *